United States Patent
Alfano et al.

(10) Patent No.: US 8,264,971 B2
(45) Date of Patent: Sep. 11, 2012

(54) METHOD FOR MANAGING RESOURCES IN A PLATFORM FOR TELECOMMUNICATION SERVICE AND/OR NETWORK MANAGEMENT, CORRESPONDING PLATFORM AND COMPUTER PROGRAM PRODUCT THEREFOR

(75) Inventors: Rosario Alfano, Turin (IT); Fabrizio Bobbio, Turin (IT); Giuseppe Cassone, Turin (IT); Giuseppe Covino, Turin (IT); Danilo Gotta, Turin (IT); Marisa Porta, Turin (IT); Marco Ughetti, Turin (IT)

(73) Assignee: Telecom Italia S.p.A., Milan (IT)

( * ) Notice: Subject to any disclaimer, the term of this patent is extended or adjusted under 35 U.S.C. 154(b) by 266 days.

(21) Appl. No.: 11/666,509

(22) PCT Filed: Oct. 28, 2004

(86) PCT No.: PCT/EP2004/012224
§ 371 (c)(1),
(2), (4) Date: Apr. 27, 2007

(87) PCT Pub. No.: WO2006/045337
PCT Pub. Date: May 4, 2006

(65) Prior Publication Data
US 2009/0122706 A1    May 14, 2009

(51) Int. Cl.
*H04L 12/24* (2006.01)
(52) U.S. Cl. .......................... 370/242; 370/250
(58) Field of Classification Search .................. 370/252, 370/250, 242; 709/224, 226
See application file for complete search history.

(56) References Cited

U.S. PATENT DOCUMENTS

| 6,243,396 B1 | 6/2001 | Somers |
| 6,516,337 B1 * | 2/2003 | Tripp et al. .................. 709/202 |
| 2003/0036886 A1 * | 2/2003 | Stone ........................... 702/188 |
| 2003/0167270 A1 | 9/2003 | Werme et al. |
| 2003/0233391 A1 | 12/2003 | Crawford, Jr. et al. |

FOREIGN PATENT DOCUMENTS

WO    WO 01/02973 A1    1/2001

OTHER PUBLICATIONS

P. O'Brien et al., "Using Software Agents for Business Process Management," British Telecommunications Engineering, vol. 15, No. 4, pp. 326-333 (Jan. 1997).

* cited by examiner

*Primary Examiner* — Huy D Vu
*Assistant Examiner* — Omer Mian
(74) *Attorney, Agent, or Firm* — Finnegan, Henderson, Farabow, Garrett & Dunner, L.L.P.

(57) ABSTRACT

A method and system for managing resources in telecommunications services and networks. The method and system regard execution of processes by distributed agents on processing machines to perform predetermined tasks on the network, and are characterized by setting target data including goals on processes and constraints on resource utilization to be met by the system; monitoring computational resources utilization and processes execution by agents, and collecting performance data representative of resource utilization and process execution; comparing the collected performance data with the set data, a penalty being established when performance data do not fulfill target data; and re-allocating resources for process execution by agents so as to minimize the penalty determined on the basis of the comparison.

29 Claims, 7 Drawing Sheets

METHOD FOR MANAGING RESOURCES IN A PLATFORM FOR TELECOMMUNICATION SERVICE AND/OR NETWORK MANAGEMENT, CORRESPONDING PLATFORM AND COMPUTER PROGRAM PRODUCT THEREFOR

CROSS REFERENCE TO RELATED APPLICATION

This application is a national phase application based on PCT/EP2004/012224, filed Oct. 28, 2004, the content of which is incorporated herein by reference.

FIELD OF THE INVENTION

The present invention relates to a method for managing resources in a platform directed to manage telecommunication networks and/or services. In particular, the invention concerns a method for allocating resources in platforms for management of telecommunications networks and/or services and a corresponding management platform.

BACKGROUND OF THE INVENTION

In the field of communication networks/services, management platforms are provided which include a plurality of components such as Operations Support Systems (OSS) organized on hierarchical architectures, sometimes based on agents.

U.S. Pat. No. 6,243,396 discloses, for example, a communication network management system or platform. having a multi-layer hierarchical architecture of interconnected management authorities controlling telecommunication network resources. Each authority has a number of agents responsible for the execution of processes, which may be intelligent or simply reactive agents.

In the known architecture, the reactive agents are located within a platform part of the authority and the intelligent agents are located within a controlling part of the authority. The intelligent and reactive agents are grouped into functional components to provide FCAPS (Fault, Configuration, Accounting, Performance, Security) functionalities to the platform.

WO 01/02973 teaches use a platform comprising a centralised process coordinator for coordination of distributed agents, typically realized with a workflow engine running workflow descriptions (similar to flowcharts) which comprise delegation of jobs to components (the agents), collection of responses from agents, and so on.

Applicant believes that the above architectures do not ensure that agents execute jobs delegated by the workflow engine.

In fact, IT resources available to agents, like computing power, are limited and it is not granted that IT resources are enough to match business goals or workload requested to the platform.

In other words, IT resources available to agents can prevent reaching predetermined business goals which require tasks, as for example the delivery of a service to a customer, being performed by the agents.

For example, a task can be the completion of a determined process in an average time shorter than a predefined time duration, or the completion of a determined number of processes within a fixed deadline.

Huge workload on an agent may prevent the agent from completing the task in a predefined average time or within the fixed deadline therefore causing the business goal not to be reached.

Another problem in agent-based architecture using a centralised process coordinator, as disclosed in WO 01/02973, is that the coordinator itself becomes a bottleneck in operation of the platform, and the more process logic is externalized from the agents adding workflows into the coordinator to improve flexibility, the slower the coordinator becomes. That can worsen the ability of the architecture to cope with business performance goals, like processes with deadlines for their execution.

In the field of IT resource management US patent application no. 2003/0167270 discloses a resource management system in a distributed environment comprised of hosts instantiating copies of a scalable application. The resource management system generates signals to start up, shutdown or move selected copies of a scalable application across the hosts, based on information on application copies and host performance.

This kind of solution is not well suited for a platform comprising a distributed agent architecture coordinated by a or process coordinator or workflow engine for at least the following reasons:

- in case that all agents are already executing some tasks there can be no free agents for a new execution of an urgent task or application;
- each time a new workflow (i.e. a new functionality) is defined, in order to meet business goals (e.g. deadlines on business processes), the known system needs to measure parameters on the applications and build a new model to tune the behaviour of all the agents;
- the known resource management system works only for the applications or functionalities that can be instantiated into multiple copies.

SUMMARY OF THE INVENTION

Object of the present invention is therefore to provide a method for managing resources of an agent-based platform for managing telecommunications services and/or networks, which improves the efficiency of the platform by achieving the optimal performance in resource utilization in order to fulfil predetermined business goals.

Another object of the invention is a management platform having a decentralized process logic in order to achieve better performances of the platform while improving its flexibility.

According to the present invention, these objects are achieved by means of a method for managing resources in a platform for managing-telecommunications services and/or networks as well as by the management platform having the characteristics referred to in the independent claims.

Further objects of the invention are a computer program product or computer program set, a telecommunications network and a method for the set up and running of a telecommunications management platform as claimed.

In summary, in order to overcome the drawbacks of the prior art, the invention discloses a method and a corresponding platform based on a predictive and adaptive mechanism driven by predetermined indicators (e.g. business key indicators) and goals, which provides for the measuring and automatic control of IT resources utilization in a management platform.

Preferably the architectural features of the platform according to the invention are:

the provision of process (workflow and rules) engines inside agents for implementing all the functionalities provided by them, so that jobs that agents have to run become workflow executions. The rule engines can be coupled to workflow engines to perform certain types of jobs.

the provision of a centralized process descriptions database for the definition and storage of process descriptions, and for distributing these descriptions to the agents.

the provision of a Goal and Constraints Console, that allows specification of target data including business goals (e.g. SLA, Service Level Agreements) and process priorities based on the definition of functionalities and their aggregations (e.g. into business process areas like fulfilment, assurance, billing);

the provision of Control Agents arranged for monitoring use of IT resources by each process execution in each agent of the platform, as well as execution of workflows by the business processes, i.e. for example for monitoring the elapsed time, the frequency of execution and so on; and the provision of a Resource Allocating Module arranged for reallocating IT resources to each agent of the platform in an adaptive way on the basis of specified target data (business goals) and monitored performance data representative of resource utilization, in order to provide the maximum level of business goal achievement.

Advantageously, according to a preferred embodiment of present invention, a Re-allocator Console is provided as a Graphical User Interface to define resource reallocation rules, and a Monitoring Console is provided, which allows to control SLA fulfilment trends and corresponding IT resources utilization and related costs.

The provision of process engines inside agents proves to be an advantageous feature for dynamic allocation of IT resources between agents, improving flexibility without introducing bottlenecks, which is the case when all engines are placed in a centralized process coordinator. Process engines inside agents allow to measure resource utilization in the agents analytically (for example CPU time or RAM used) for each functionality execution (i.e. process execution).

Process descriptions in the centralized database are distributed across the platform to each agent for use within their process engines, achieving automatic synchronization with all operating functionalities of the platform, so that it is possible to tune the resource management procedures working with the semantic of the jobs.

In practice, an administrator of the platform for managing telecommunications services and networks can build any FCAPS (Fault, Configuration, Accounting, Performance, Security) functionality defining in the process database one or more workflows and/or rules or combining existing ones; then automatically the agents acquire the new process (workflow and rules) definitions and run them when needed. Automatically, the Goal Console permits to define SLA and priority on new processes. At run time, the Control Agents allow to control SLA trends and corresponding IT resources utilization for the new processes so that the Re-allocator module may optimize the overall configuration, i.e. change workflows priorities at an agent or supply it with more computational resources (CPU, memory, etc. . . . ).

Resource management according to the present inventions is preferably implemented in the platform by a centralized module (a Manager Module) together with distributed modules (Control Agents). The combination of centralized and distributed functionalities is the basis of the adaptive mechanism of the solution.

BRIEF DESCRIPTION OF THE DRAWINGS

Further characteristics and advantages of the invention will be explained in more detail in the following description, provided by way of non-limiting example with reference to the appended drawings, in which.

DETAILED DESCRIPTION OF A PREFERRED EMBODIMENT

Figure 1:
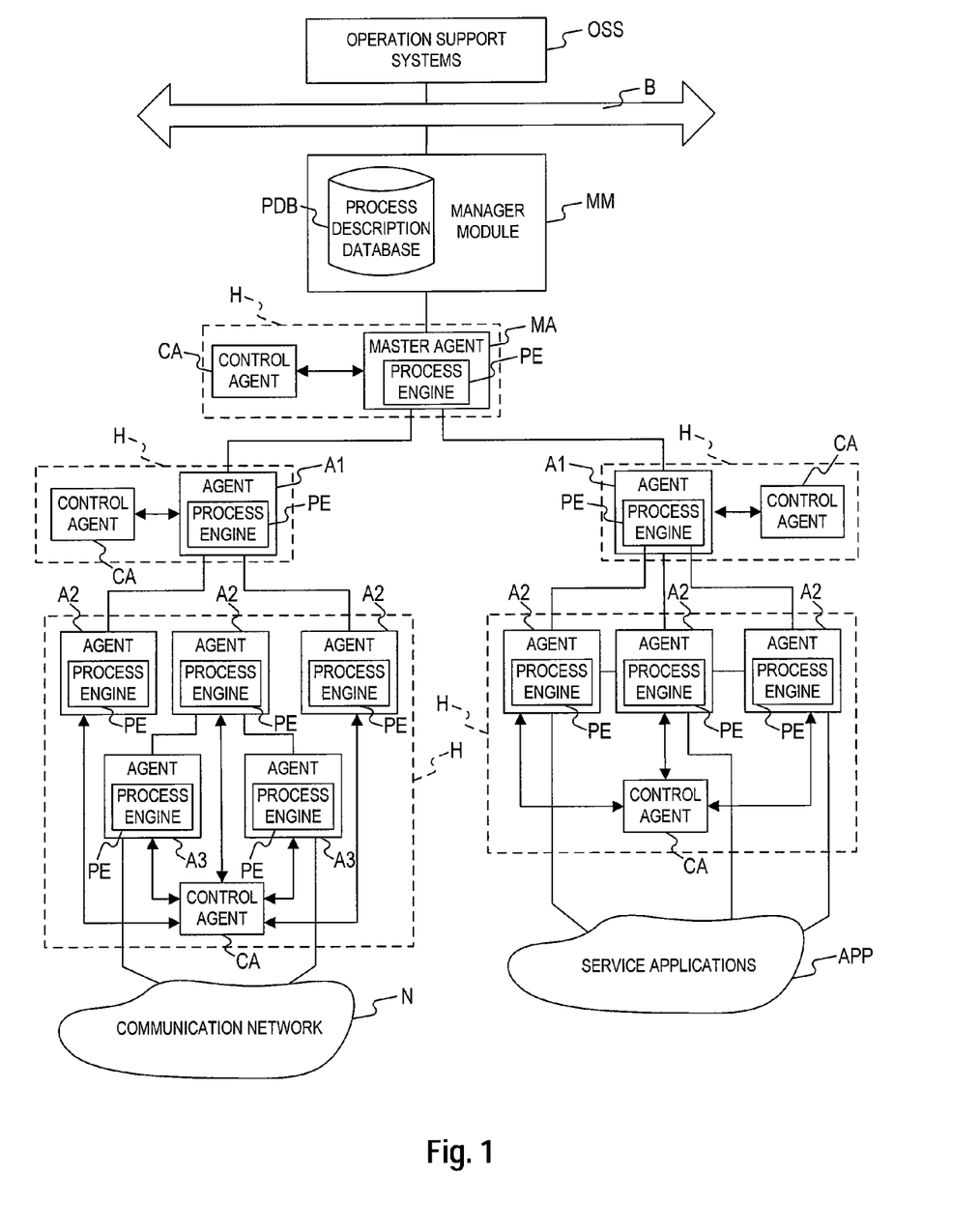
FIG. 1 is a block diagram showing the architecture of a system or platform for managing telecommunications networks and services according to the invention.

FIG. 1 depicts an exemplary architecture of a system for managing telecommunications services and networks according to the invention. The system is preferably implemented on a distributed processing architecture comprising a plurality of processing host machines H, each of which may include one or more software agents (A1, A2, A3).

The system (or platform) comprises a centralized control module or Manager Module MM including a program or set of programs running on a host machine and interacting with distributed agents for various coordination actions, like distribution of process descriptions, invocation of operations, administrative controls, etc. The Manager module MM may also preferably include a graphical user interface for interaction with a user such as a system administrator.

In this specification, the term process is used for representing one or more workflows, one or more rules or, preferably, a combination of one or more workflows and one or more rules.

The workflow can be defined as the automation of a business procedure during which information or tasks are passed from one agent to another for action, according to a set of procedural rules.

The workflow can be represented through a flowchart with a sequence of tasks as well as time and logical dependencies between tasks including alternative or parallel branches. There exist ad hoc languages like XPDL (XML Process Description Language) to formalize workflow descriptions.

The rules are declarations of which actions have to be executed when a specific set of conditions/events occurs.

The manager module MM comprises a process description database PDB, which is arranged to store all the processes, i.e. workflows and rules, representing the behavioural and functional aspects of the platform.

The database PDB further comprises, for example, data models handled by workflows and rules.

The process description database PDB can be associated with, for example, the catalogue part of any conventional Network Inventory system as known to a man skilled in the art.

The architecture of FIG. 1 includes a plurality of multi-layered Agent Modules, three layers having been shown as a way of example including some agents A1, A2, A3 respectively. Agents belonging to the same level may be connected to each other or may be independent from each other. They are coupled to an agent of higher level, if any. At the lower level an agent is coupled to a network element under control (generally shown as the communication network N), for example to an ATM switch, or to other service applications APP, such as mail server applications or VAS server applications, i.e. value added service applications such as mobile phones answering machine services.

The manager module MM itself is connected, for example, through a communication bus B to other operations support systems OSS of the platform.

A master agent MA or, depending on the type of implementation, a plurality of master agents MA (not disclosed in FIG. 1), acting as coordinators are provided at the root of the multi-layered agent architecture, associated to the manager module MM.

Each agent A1, A2, A3 includes a process engine PE and is responsible for the execution of some processes using process engine PE.

The process engine is the software module that executes workflows and/or rules.

Process engines PE are advantageously embedded within each agent since an external location of the process engine would mean having remote invocations that can cause performance degradations.

Preferably, processes of each agent can be externally invoked by other agents having the same level or an higher level, and correspond to the services that each agent offers to the invoking agents.

Process engines for any layer are intended to be a combination, for example, of a workflow and a rule engine able to manage, respectively, workflows and rules. For example, a provisioning process is better represented as a workflow, while an alarm correlation could be better represented as a combination of rules. Where possible, the use of workflows is preferred because it does not involve the complexity of dealing with rule conflicts and rule management.

The multi-layer architecture shown in FIG. 1 allows the segmentation of a process in different levels. There are no constraints on the number of levels in which the agents can be arranged. In this way it is possible to set up the architecture in order to find the trade-off between having the lowest possible number of layers and allowing free allocation of processes between a distributed and a centralized organization. This segmentation also enables providing different service views, from a business view to a system view.

In the following, workflows engines are considered as preferred, but rules engines are also applicable.

Each host machine running agents (both the master agent and sub-level agents) preferably includes one or more Control Agents CA. They are modules responsible for measuring the resource utilization and the performance of local agents (i.e. agents running on that host) as well as performing local optimization of resource management. The Control Agents CA are coupled to the Manager Module and to other Control Agents and send measured data to the Manager Module and/or to other Control Agents.

The manager module MM, whereof the structure will be described later on, is responsible for administration, configuration and control of the platform. It is arranged for analyzing incoming data from human operators and from external OSSs and deciding how to tune the platform configuration in order to meet business performance goals. Its main tasks are the following:

distribution of process descriptions and data models from the process database (PDB) to the agents;

monitoring of the state of the platform with information provided by the Control Agents, included distribution of agents on host machines, domain management (partitioning of whole network among the agents), performance monitoring;

execution of actions for optimal usage of resources allocated for process execution by agents through interaction with related Control Agents; example of these actions are modification of load balancing between agents and changes in the priorities of workflows, i.e. rescheduling queuing jobs in one or more agents;

interactions with external systems, like other Operations Support Systems.

The master agent MA, whereof the structure will be described later on, is responsible for top level coordination of process execution. In actual fact, processes charged to agent of the top layer can involve sub-processes charged to sub-layers agents. Moreover, there are processes characterized to provide functionalities that require interaction with external entities (other than agents) or coordination among agents that cannot easily or efficiently be performed in a distributed way by the lower layer agents. Processes to be executed by an agent are those ones that must be executed in a distributed way.

Each Agent (A1, A2, A3) can support any network and service management functionality (i.e. process), such as any FCAPS (Fault, Configuration, Accounting, Performance, Security) functionality. This enables runtime task-customization of agents and functionality reallocation on agents based on task priority and resources needs, like for example dedicating more agents during daytime to service provisioning and more agents during the night-time to network optimization.

The provision of process engines PE in agents enables monitoring the utilization of resources by each functionality (i.e. process) execution as well as the occurrences of functionality invocations. These data are the primary source of information for automatic platform control operated by the manager module MM.

Each Agent (A1, A2, A3) shows both a reactive and a proactive behavior, being triggered on events but also giving the spontaneous start to processes.

Preferably, an agent module is movable, by a Control Agent or the Manager Module, across processing machines for easier deployment, for example for fault tolerance issues fulfilment.

Figure 2:
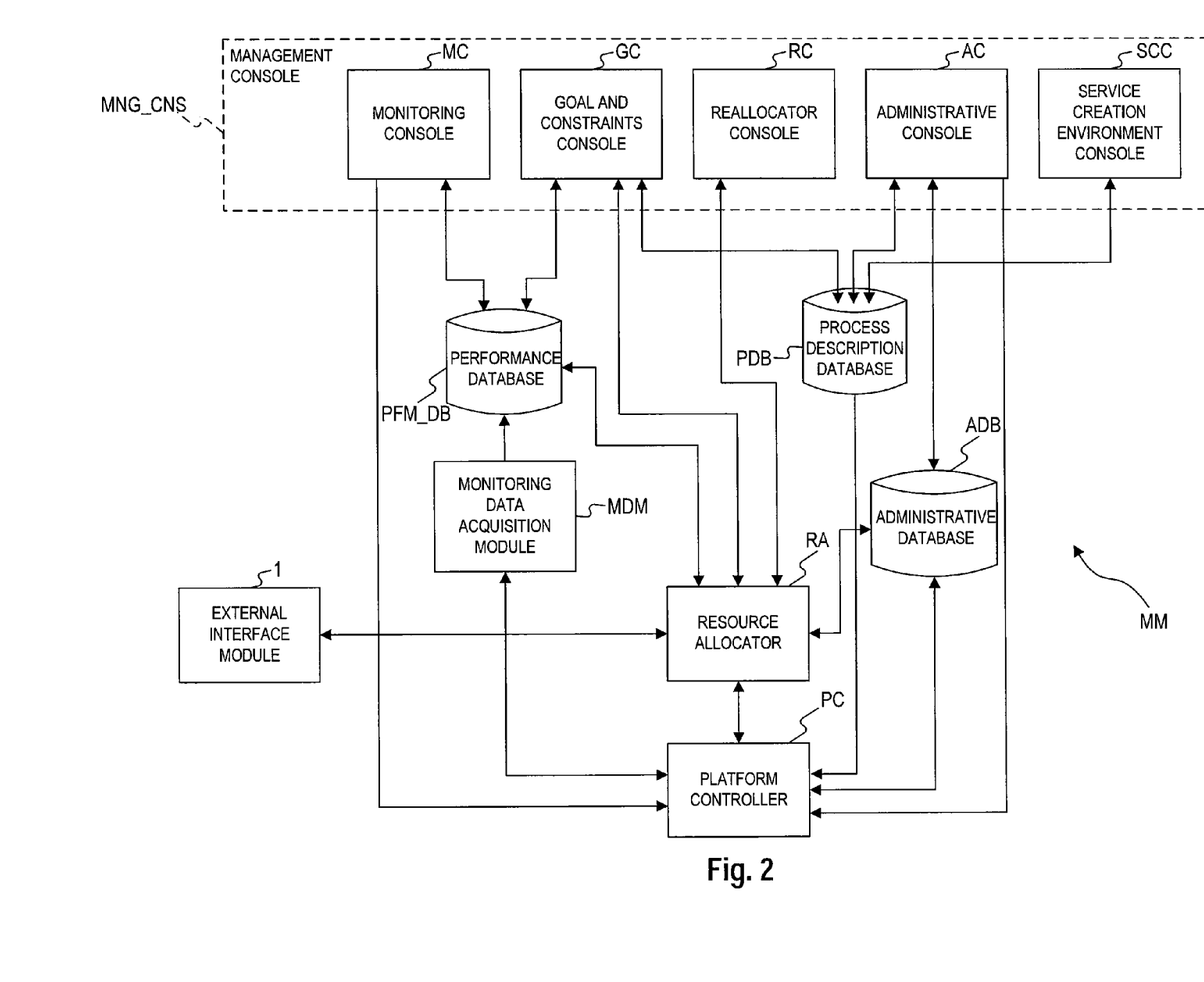
FIG. 2 is a block diagram showing the internal structure of the Manager Module of FIG. 1.

FIG. 2 shows the internal structure of the manager module MM according to the preferred embodiment of the invention.

The centralized manager module MM is organized, for example, in sub-modules.

One of the sub-modules is the MNG_CNS console, generally indicated as Management Console MNG_CNS; the Management Console MNG_CNS, in the preferred embodiment, includes:

a Monitoring Console MC having associated a Performance Database PFM_DB holding platform performance data;

a Goal and Constraints Console GC;

a Re-allocator Console RC;

an Administrative Console AC having associated an Administrative Database ADB comprising administrative data managed by the Administrative Console; and a Service Creation Environment Console SCC, so as
a Capacity Planning Module (not shown); and
a Forecast Console (not shown).

The Goal Console GC, the Administrative Console AC and the Service Creation Console SCC are all coupled to the process description database PDB.

The manager module MM comprises a Resource Allocator RA directly coupled to the Goal and Constraints Console GC and to the Re-Allocator Console RC.

The Resource Allocator RA is also coupled, for example, to the Administrative Database ADB, as well as to the Performance Database PFM_DB holding platform performance data.

The manager module MM further comprises, in the preferred embodiment, a Monitoring Data Acquisition Module MDM and a platform controller PC.

The Monitoring Data Acquisition Module MDM is arranged for transferring performance data from the platform controller PC to the Performance Database PFM_DB.

Moreover, the Resource Allocator, for example, may be coupled to an external interface module I for monitoring interactions among external OSSs and the management platform.

The platform controller PC, operates, in general, as a mediator between the manager module and the agents.

In particular, the platform controller PC, implements connection with the Master Agent MA (not shown) external to the Manager Module and with the Resource Allocator Module RA and is coupled with the Monitoring Console MC, the Monitoring Data Acquisition Module MDM, the Administrative Console AC and the Administrative Database ADB, so as with the Process Description Database PDB.

The Goal and Constraints Console GC is intended for definition of business goals (e.g. Service Level Agreements or SLA) and constraints, jointly referred to as target data, associated to processes stored in the process description database PDB.

Service Level Agreements or SLAs are a (contractual or simply agreed) quantification of the business process level quality. The SLAs are based on performance indicators (average execution time, percentiles, or others) and declare the values for these indicators to be guaranteed on the platform. Generally, a SLA can be described through a specific language (a "grammar") identifying a SLA goal (a performance indicator) and a SLA penalty clause (a SLA cost function based on the comparison between the SLA goal and the collected performance data), for example, an estimate of economical penalty of SLA violation.

A SLA can be associated to a general business process (e.g. workflow) or to one of its specializations (identifiable in one or more workflow attributes), wherein the SLA for specializations typically overwrites the root business process ones, if any.

Constraints concern data about resource utilization. They preferably include:
  pre-allocated resources expressed in terms of minimum throughput to be guaranteed, minimum number of manageable network elements (it's preferred to use the term "throughput" instead of the percentage of utilization, to use a more understandable business metric);
  maximum number of allocable resources (expressed in cost or in percentage of the global resources; for example, a default value could be 50%).
If a business constraint is modified, a check is needed to verify whether pre-allocated resources overtake the maximum allocable power or not.

The Resource Allocator RA (hereinafter Re-Allocator), according to a preferred embodiment of present invention, is centralized and manages allocation of resources to agents in order to adaptively control the platform. It is arranged to receive, for example:
  i) business goals from the Goal Console GC;
  ii) monitored performance data (such as execution time) and hardaware resource utilization of every host machines, acquiring these data from the Performance Database PFM_DB;
  iii) optionally, information coming from load testing, i.e. measures about resource utilization for heavier utilization of workflows;
  iv) data about available host machines and their hardware characteristics (normalized CPU speed, for instance using SPECINT2000 rate by the Standard Performance Evaluation Corporation); this is to monitor the overall processing power (measured, for instance, in seconds per hour of a reference CPU);
  v) hardware resource utilization of every host machine (from the Performance Database PFM_DB).

The Re-allocator RA preferably comprises two sub-modules: an Evaluate module and a Decide module, whose exemplary description and functionalities are given in the following of the specification.

The Evaluate module is arranged to receive data about
  top level (MA) workflow execution requests, and
  workflow execution request queues in all agents.

Moreover, the Evaluate module is arranged to analyze historical trend of past workflow execution requests and the trends of the managed communication network in terms of elements and complexity.

The Decide module is arranged to decide, on the basis of the previous information, if the platform is able to handle all the requests according to some criteria as will be specified later on.

If the platform is not able to manage all the requests, the Decide module is arranged, for example, to send a warning message and decide which action can improve the situation.

In particular, if resources are enough, but SLAs are not completely met, the Decide module is arranged to redistribute processing (i.e. workflow execution) across the platform. Preferably, these actions take care of the constraints and the priorities associated to the different instances of workflows.

The Administrative Console AC is intended to define and monitor, for example, at least a set of the following:
  i) the hardware configuration of the platform, i.e. of the hosts H bearing processing capabilities for execution of processes by distributed agents; For example, when a new host machine is added to a hosts predefined group, it is automatically joined to the whole platform, e.g. because the host notifies its existence or, alternatively, the Administrative Console recognizes the host H by receiving commands input by an operator, for example through its GUI;
  ii) the GUI for definition of software distribution/allocation (i.e. the interface to receive data concerning the constraints in the Goal and Constraints Console GC). Specifically, it is used for example to set groups of host machines based on:
    Geographical constraints (for instance, certain workflows could be executed only on agents installed in a region and not in another, or they could be executed only on particular host machines);
    Hierarchical constraints (for instance, on particular machines can run only second level workflows);

Service constraints (i.e. constraints on specific types of processes);

iii) the Workflow schedules (for example, a service provisioning workflow is scheduled only in morning hours).

The Re-allocator Console RC is arranged for definition of resource reallocation policies, i.e. instruction of when and how re-allocate resources in order to optimize business goal satisfaction on the basis of business constraints and monitored data. The Re-allocator Console allows to enter policies both for centralized and distributed control. In particular, it allows definition of:

i) rules for the centralized control, defining when and how to act on workflow priorities in order to reach the best possible level of SLA satisfaction; these rules look at the managed platform as a whole (i.e. they do not make direct actions on machines) and work on the basis of all the Resource Allocator Module input data and predictive data;

ii) rules for the distributed control, acting on single agents through related CA (thread parallelism and load balancing) with the aim of optimizing the usage of local software and hardware resources;

iii) functions calculating complex expressions involved in rules.

The Monitoring Console MC is arranged for browsing monitoring information such as:

i) average hourly throughput (e.g. daily), number of requests in queue (e.g. daily), average execution time (e.g. daily), deadlines for every business transaction on which goals have been set;

ii) situation of SLAs (highlighting violated ones) calculated over sampling interval times, in terms of difference between the agreed and the measured value of a SLA indicator, and evaluation of the related cost function;

iii) hardware resource utilization for every workflow, for example in terms of seconds of CPU usage and/or used RAM (both for a single level and for every level below it); as every host machine has different computing power from the others, hardware resource utilization, for example CPU usage, is normalized to a reference CPU;

iv) accounting information: resources used by every workflow (in terms of percentage out of the total and in terms of cost).

The Monitoring Console MC enables to browse, in a hierarchical way, performances and resource utilization of workflows (in particular, every block of workflow). For every SLA, it is possible to issue reports about workflows which, due to a heavy utilization of resources, are worth being optimized. If other points of measure are set on different level of workflows, they are presented on the MC too. Besides, the MC shows information about billing, in terms of resources used by the workflows.

The Service Creation Environment Console SCC is arranged for definition, creation and modification of the processes in the PDB, thus of every business functionality provided in the management platform. It is based on a graphical interface to facilitate this task. This console also allows the insertion of new monitoring points on the workflows.

In a further embodiment, the data managed by the MM modules are also used to achieve a useful capacity planning by adding to the MM modules a Forecast Console and a Capacity Planning Module.

The Forecast Console is arranged to set utilization forecasts in order to achieve a useful capacity planning activity. Input of this console are:

i) the expected throughput; and ii) the expected number and types of network hosts (this figure can be even calculated as projection of data in the process description database).

The Capacity Planning Module is arranged to assure hardware resources over the time. It is arranged to receive inputs from the Forecast Console and other Consoles (the Goal & Constraints Console, the Administrative Console and the Re-Allocator Console) and to verify availability of resources. If resources are not enough, the Capacity Planning Module is arranged to warn an operator of the console about the amount of hardware needed to meet the expected increased trend. This module bases its analysis on a set of parameters including at least one of the following:

i) the expected throughput (in terms of historical trends);

ii) the information of resource utilization of every workflow (and especially of the first level workflows);

iii) geographical constraints.

Since the Capacity Planning Module is based on uncertain data (especially, long term data) it is arranged mainly for information purposes. It may highlight future needs, but it does preferably not interact with the Resource Allocator RA.

Figure 3:
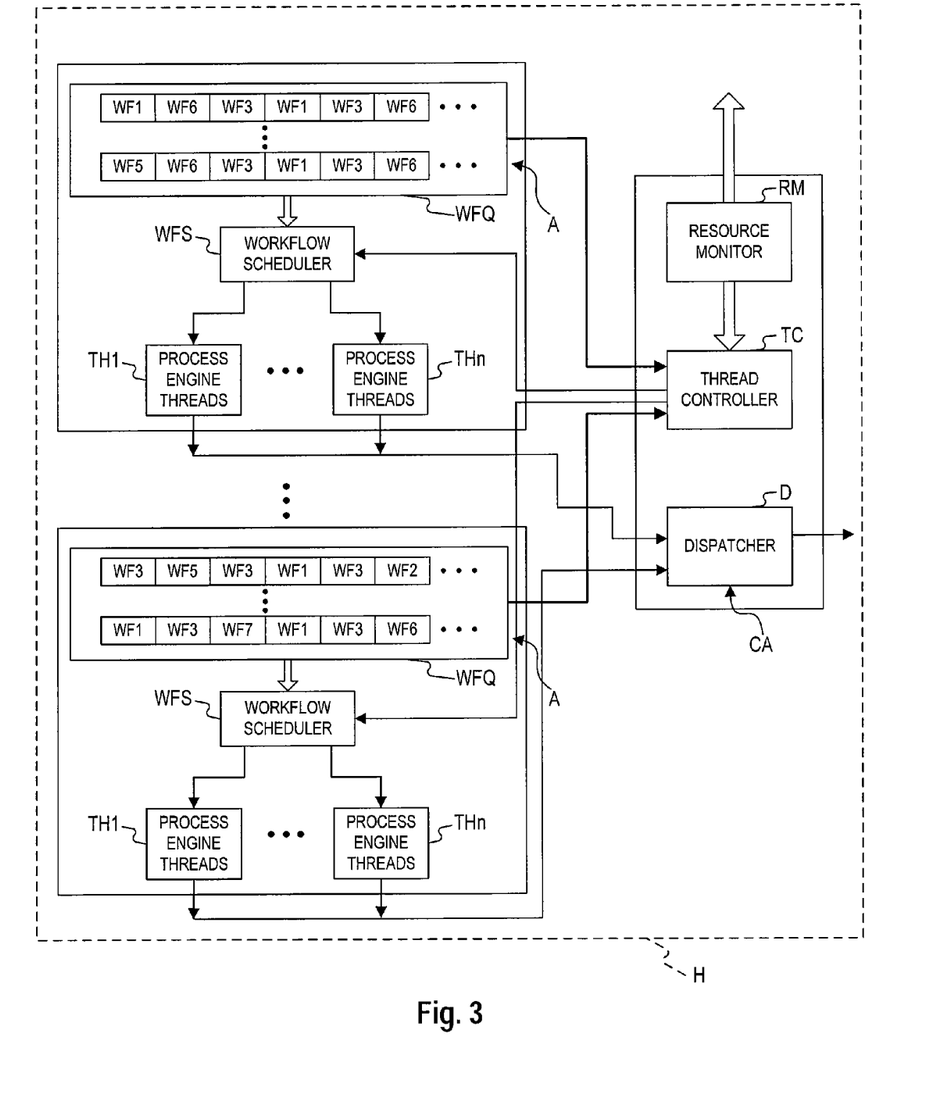
FIG. 3 is a block diagram showing the internal structure of a host machine of FIG. 1, with Agent Modules and Control Agent.

FIG. 3 shows an example of the internal structure of a host machine including agent modules A and a control agent CA responsible for the overall performance of the host and the control of all the agents that run on that host.

Each agent A includes at least a set of the following components:

a Workflow Queue or queue WFQ; it is a multilevel priority queue where each sub-queue holds requests with the same priority. Each workflow request sent to the agent is inserted in the corresponding sub-queue based on its priority. Different workflows are indicated WFl, ..., WFn in the FIG. 3. To avoid starvation of workflow requests in the avoid starvation of workflow requests in the sub-queues, the queue WFQ implements a priority upgrade for the requests in the sub-queues based, for example, on a timeout criterion. Associated to the queue WFQ there are information on the queue WFQ, and particularly:

the estimated CPU consumption time, calculated adding the CPU consumption times of the workflows in the queue measured for each type of workflow (these data are acquired from the PFM_DB); and the request input rate, which statistically estimates the rate (e.g. workflow/hour) at which a workflow of a specific type is requested to be executed by another agent (requests are queued in the agent).

a Workflow Scheduler WFS associated with the Workflow Queue WFQ: it is arranged for scheduling the workflows WFn contained in the queue based on their priorities. Every time one or more process engine of the agent is ready to execute a workflow, the scheduler sends the higher priority workflow in the queue to one of the waiting process engine thread.

a plurality of Process Engine threads TH1, ..., THn controlled by the Workflow Scheduler WFS; every agent is able to run a configurable number of workflows concurrently. This is achieved by configuring a plurality of Process Engine threads TH1, ..., THn (independent executors) in the agent. Each Process Engine thread TH1, ..., THn is able to execute one workflow at a time, e.g. a thread implemented in java language.

The control agent CA includes at least a set of the following components, preferably software implemented:

a Resource Monitor RM: this component is arranged for monitoring and collecting data concerning the hardware and software resource utilization in the agent under its control.

Its role is to measure both the current resource utilization on the host including the agents (agent host) and the CPU and memory consumption due to a workflow execution. The measured values are sent both to the manager module MM and to a Thread Controller TC;

a Thread Controller TC: it is coupled to the Resource Monitor RM and the Workflow Queue WFQ, and is arranged for local performance control. It is aimed to actively manage the parallelism of agent threads. It is arranged for receiving as input the number of workflows that are waiting to be executed in the queue, the CPU usage and the total number of PE threads of the machine being executed. Based on the above inputs, the thread controller TC increases or decreases the number of Process engine threads (PE threads) in order to achieve the best workflow execution parallelism. It creates, for example, new PE threads if the queue contains workflows that are waiting to be executed, if the total number of PE threads is below the maximum permitted and if the CPU usage is below a specified threshold. If the agent is in charge of the direct interaction with an external resource (such as a device, a network equipment, etc.), the maximum number permitted of PE thread is however limited by the allowable concurrency of the external resource. Moreover, the thread controller runs a garbage collector of PE threads when it detects that some PE threads are not being used for a defined period of time.

a Dispatcher D coupled to the process engine threads: this component is arranged for sending workflow execution requests to other agents. Each PE thread uses the dispatcher D to send such a request.

The dispatcher sends the requests to the other agents using, for example, a load balancing algorithm as follows. It chooses the best agent to send the request in two steps.

First, it chooses the less loaded host in terms of CPU and memory. Second, it chooses the available agent of the selected host based on the smallest amount of estimated CPU consumption time of the agent queue.

The control agents CA, by their side, preferably have an important feature according to a preferred embodiment. They are able to actively manage the parallelism of their process threads (local optimization). The two capabilities of queue re-ordering and parallelism management joint together are the basis of the adaptive mechanism according to an aspect of the invention.

Figure 4:
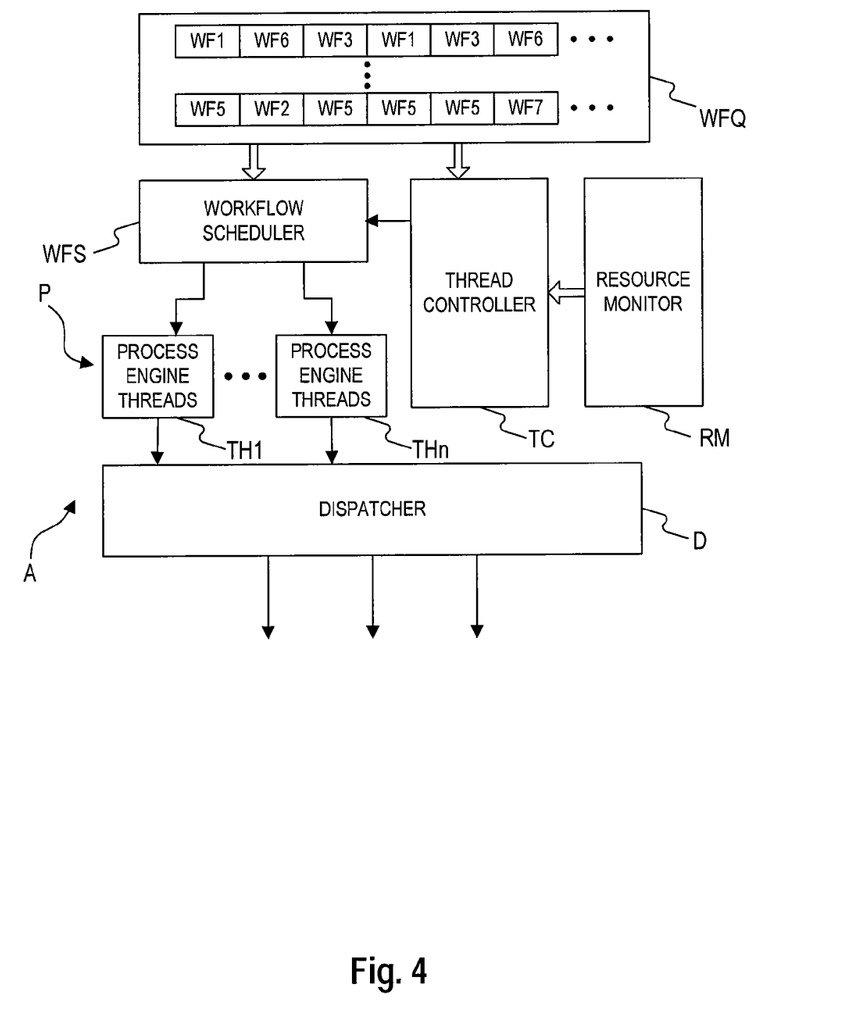
FIG. 4 is a block diagram showing the internal structure of Agent Modules according to an alternative embodiment.

According to an alternative embodiment of the invention, depicted in FIG. 4, the Resource Monitor RM, the Thread Controller TC and the Dispatcher D can be annexed to the agent module, for example if there are is a single agent module A on a host machine H.

A preferred embodiment of the system of the invention is implemented using JADE (Java Agent Development framework) for implementing agents with mobility features, XPDL (XML Process Definition Language) for process definition, and an XPDL workflow engine as Shark.

Below, a more detailed description of the Resource Allocator module is given, with a view to show its operation.

The Reallocator RA can be implemented as an expert rule-based system with functionalities of constraints processing, data manipulation and configuration changes. All the data, constraints and rules coming from the managed network, external systems, human knowledge and internal analysis constitute its knowledge base, which may be materially represented by an associated knowledge database.

The Re-Allocator module RA executes the Evaluate and Decide modules at predetermined intervals of analysis, which can be set on a case by case basis depending upon the context of the scenario.

First, Reallocator gets data about process requests from external systems through bus B in order to evaluate the number of service/function requests forecasted for the subsequent time interval and maintains this information in the associated knowledge database.

Then, the Decide module activates the resource reallocation rules in order to find out the actions to be taken in order to achieve predetermined business goals in an optimised way.

In detail, at each interval T, the resource allocator module considers the number of queued requests and the number of forecast requests based on historical basis. It performs a first evaluation of the amount of available hardware resources (mainly CPU and RAM). These data are possibly tuned using actual measured data at the end of the interval, considering a "Background error correction", which will be described later.

The following data are collected in a statistical way:
CPU needs for each workflow, at each level; and
top level workflow composition in terms of sub-workflows requests (with CPU needs associated to every level of the architecture; this information must also consider geographical constraints, if any).

The collected information are correlated to the length and composition of the queues at a time t and to the number of requests expected (by forecast) during the interval [t, t+T] to calculate the total request of CPU power for the subsequent intervals, intended as a set comprising the following interval or a set of intervals located after a plurality of intervals.

The total amount of CPU, i.e. the requested computing power for the new interval (considering level and geographical constraints), is then compared to the available CPU power. If it is not enough, a warning (requesting new hardware) is generated to the console and priorities of workflows will determine how the load will be handled.

If a "Background error correction" is considered for tuning data about available hardware resources, then at every interval, for every workflow and for every host machine the amount of CPU used during the previous interval is compared to the amount of CPU used by the different workflows. This value is used to "correct" the actual availability of CPU during the subsequent interval.

The method and system according to the invention use a policy based on priorities, whereby there are different levels of priorities. At every interval T, the Decide module, according to a management algorithm can manipulate priority queues to achieve business goals. To avoid starvation, if a workflow request spends too much time into a low-priority queue, its priority is automatically updated so that the request is moved to a higher priority queue.

The management algorithm, according to a preferred embodiment of present invention, is based on an adaptive solution for improving the resource configuration at every step and trying to reach the best configuration with an incremental behavior. The results of the present approach are guaranteed by using an interval of analysis which is at least two or three times the average workflow execution time (a reasonable interval will depend on the context of the application and can vary from 5 minutes to 1 hour or more).

A priority is associated to every execution of workflow, taking into consideration:
the situation of the agreed SLA (more risky workflows will keep an higher weight);

the initial priorities defined in the Goal Console for workflow, so as priority and economical implication of each SLA;

the amount of minimum pre-allocated resources for workflow; and the amount of maximum allocable resources (defined during the initial negotiation of SLA).

This means that priority is time-dependent. If an instance of workflow performance is getting close to the SLA (i.e. its performance is degrading) its priority will be set higher.

Instead of process engines, any means to define and measure execution of functionalities can be used, for example CPU estimation with statistical techniques.

In the following, an example of performance adaptation scenario based on the proposed architecture is shown. The resource to be optimised is CPU load.

According to the present scenario, top level workflows are services associated with an SLA characterized by a priority property, expressed in terms of percentage of workflows to be completed within a time $t \gg \Delta T$, where $\Delta T$ is the observation interval time. Last assumption is required in order to give the platform enough time to recalibrate within the period t.

Top level workflows consist in a composition of many sub-workflows. All workflows have a priority property that affects their queue waiting time before execution and workflow CPU time slice.

Input data are:

CPU load [seconds] for each workflow and each host machine;

Constraints, i.e. same workflows can run only on a host machines subset;

first level workflow composition in terms of sub-workflows;

number of workflow arrivals in past $\Delta T$ period; and number of workflow execution in past $\Delta T$ period;

Goals are:

forecast whether computational resources are sufficient to perform all workflow executions in next $\Delta T$ interval;

forecast whether computational resources are adequate to be SLA complaint; and adaptation of workflow execution priority in order to reach SLA compliance.

The performance adaptation process is based on monitoring performed every $\Delta T$ time interval, which represents the minimum platform adaptation time.

Figure 5:
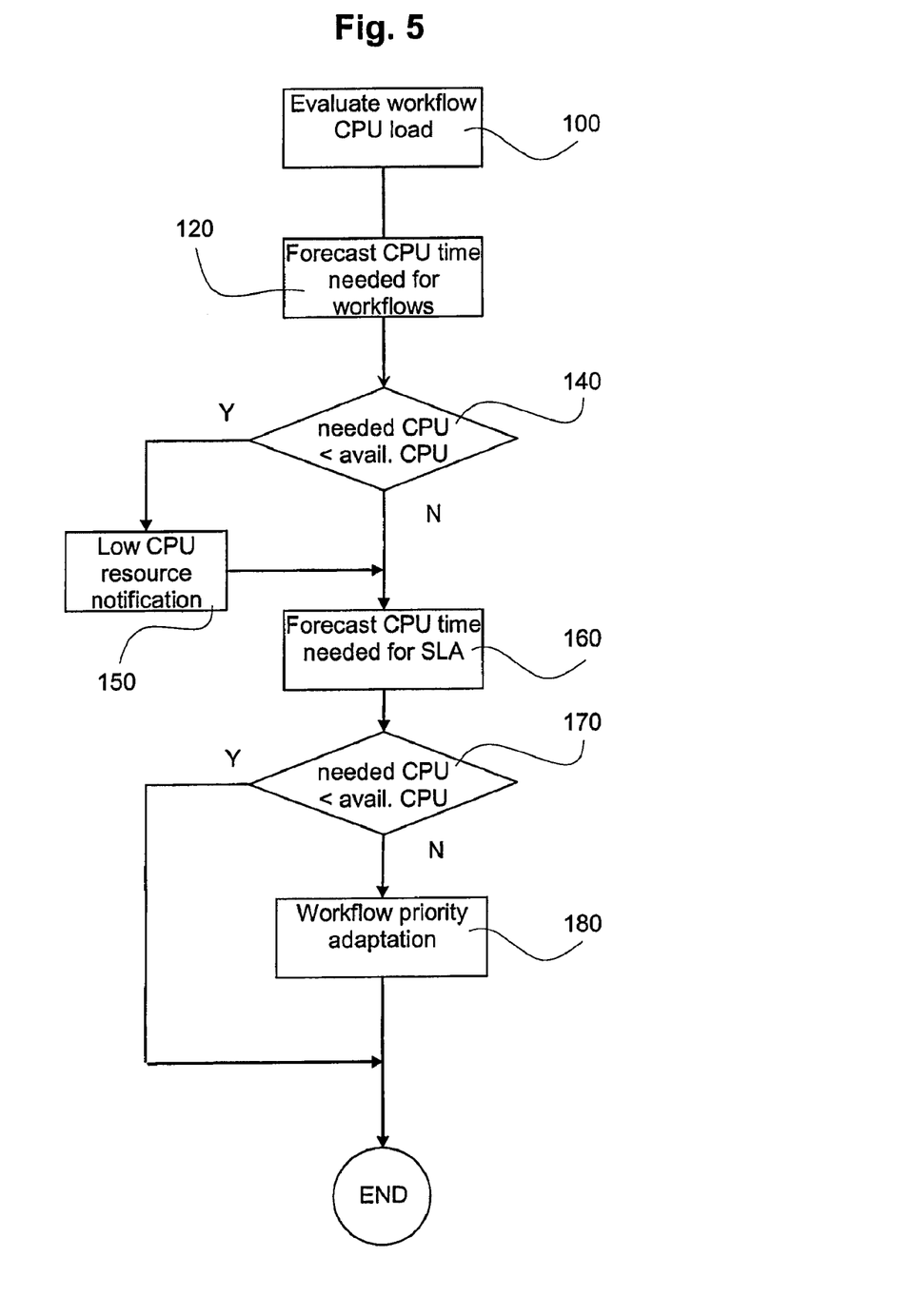
FIG. 5 is a flow chart of the resource management method according to the invention.

Referring to the flowchart of FIG. 5, which reports an example of of the monitoring performed every $\Delta T$ time interval, for each $\Delta T$ the following steps are managed by the Resource Allocator RA:

1) evaluation of the CPU load of each workflow on each host (step 100). This shall be accomplished executing a load testing workflow on a host sample and using the CPU documentation (a priori forecast). The obtained value can be fine tuned using the actual CPU time associated with each workflow executed in the previous $\Delta T$ keeping into account the constraints on the workflow execution;

2) forecast of the CPU time needed in order to execute the workflows still waiting in the queues plus the workflows the are foreseen to be arrived within next $\Delta T$ (step 120);

3) compare (step 140) the CPU time evaluated at step 120 with the available CPU time in order to identify the group of hosts which are critical in terms of computational resources, and from this the first workflow associated to the affected SLA; in case the needed CPU resource is greater then available CPU resource, notify low CPU resource (step 150);

4) For each SLA, forecast (step 160) the CPU time needed to execute the minimum number of workflows to accommodate SLA requirements, then compare (step 170) with it the CPU time available to determine whether computational resources are enough to be SLA compliant;

5) if previous step states that current platform priority configuration in running workflows cannot bear SLA constraints, the configuration must be tuned through workflows priority adaptation methodology (step 180), with a rebalance of workflow priority (keeping into account the workflow weight in terms of computational resources);

6) when either no priority adaptation is needed, or priority adaptation has been carried out the system ends the performance adaptation process and waits for the next $\Delta T$ monitoring interval.

The forecast methodology example of the performance adaptation process is hereinafter detailed. The following definitions are made:

$\Delta T$: monitoring interval and minimum system adaptation time;

$L_{wf}(n)$: CPU load [seconds] for the workflow wf execution on the host n. These values can be estimated a priori (or using an auto-learning approach) and then tuned during platform operation. For instance, with a mobile average over time.

$V_{wf}(n)$: constraint for workflow wf on host n, given by:

$$V_{wf}(n) = \begin{cases} 1 & \text{if } wf \text{ can be executed on node } n \\ 0 & \text{if } wf \text{ cannot be executed on node } n \end{cases}$$

The forecast of CPU time needed to execute all workflows foreseen within next $\Delta T$ is calculated as:

$$CpuTimeP(g) = \sum_{wf \in WF(g)} l_{wf} \cdot NEP_{wf}(g)$$

where:

g is a group of equivalent hosts for all workflows in the set WF(g). This means that each workflow belonging to set WF(g) can be executed with the same probability in one of the hosts of group g.

$l_{wf}$ is the forecast of the CPU time needed to execute the workflow wf on a host of group g, given by:

$$l_{wf} = \frac{\sum_n L_{wf}(n) \cdot V_{wf}(n)}{\sum_n V_{wf}(n)}$$

$NEP_{wf}$ is the number of foreseen executions for the workflow wf, given by $$NEP_{wf}(g) = NQ_{wf} + NAP_{wf}(g)$$

where:

$NQ_{wf}$ is the total number of workflows wf in the execution queues that shall be expressed in terms of first level workflow calls by the following:

$$NQ_{wf} = \sum_{l1} \sum_{n} Q_{wf(wfl1)}(n)$$

$NAP_{wf}(g)$ is the forecast of the total number of workflows wf foreseen in the subsequent $\Delta T$ interval time, given by:

$$NAP_{wf}(g) = \sum_{l1} \sum_{n \in g} \sum_{i} P_i \cdot NA_{wf(l1),i}(n)$$

where:
$P_i$ is the weight of the workflows arrived in a previous $\Delta T_i$
$NA_{wf(l1),i}(n)$ is the number of workflows wf arrived on the host n in the $\Delta T_i$ interval time, that are sub-workflow of the first level workflow wfl1.

Referring to the three above-mentioned goals, forecast and Adaptation steps are carried out as follows.

In order to forecast if the CPU time available is enough to execute the foreseen workflows in the subsequent $\Delta T$, the comparison between the CPU time CpuTimeP(g) and the CPU time available on group g, for each group g, is performed:

$$CpuTimeP(g) \text{ vs } \sum_{n \in g} CpuTime(n)$$

If $$CpuTimeP(g) < \sum_{n \in g} CpuTime(n)$$

the system has got enough computational resources in order to perform all tasks

If $$CpuTimeP(g) \geq \sum_{n \in g} CpuTime(n)$$

the system requires more CPU time, so it sends a message with:
a) the group g of hosts that is critical in terms of computational resources; and
b) the first level workflows associated with SLA that can be more affected by this lack of resources.

In order to forecast if computational resources are enough to be SLA complaint, for each SLA defined on a first level workflow wfl1, the number of wfl1 to be executed in the subsequent $\Delta T$ in order to be SLA compliant, $NSLA_{wfl1}$ is calculated:

If the SLA is defined as the percentage p [%] of workflows Wfl1 to be executed within the time t (with t>>$\Delta T$), then $NSLA_{wfl1}$ is given by:

$$NSLA_{wfl1} = p \cdot (NSLAQ_{wfl1} + NSLAP_{wfl1})$$

where:
$NSLAQ_{wfl1}$ is given by the sum, for each $\Delta T_i$, of the ratio between the number of workflows wfl1 still waiting in the queue arrived in $\Delta T_i$ and the number n=(t−k$\Delta$t)/$\Delta T$ of $\Delta T$s still available in order to complete these workflows in time to be SLA compliant; k is the number of $\Delta T$s since the workflow is waiting in the queue from its arrival; and $NSLAP_{wfl1}$ is the ratio between the forecast of the number of workflows wfl1 arrival in the next $\Delta T$ and the number of $\Delta T$s still available in order to complete these workflows in order to be SLA compliant (that is t/$\Delta T$)

Hence the CPU time needed in order to be SLA compliant for the workflow wfl1 is given by:

$$CpuTimeP^{SLAwfl1}(g) = \sum_{wf \in WF(g)} l_{wf} \cdot NEP^{SLAwfl1}wf(g) \text{ where}$$

$$NEP_{wf}^{SLAwfl1}(g) = NQ_{wf}^{SLAwfl1} + NAP_{wf}^{SLAwfl1}(g) \text{ where}$$

$$NQ_{wf}^{SLAwfl1} = \sum_{l1 \neq wfl1} \sum_{n} Q_{wf(wfl1)}(n) \text{ and}$$

$$NAP_{wf}^{SLAwfl1}(g) = NSLA_{wfl1} \cdot NE_{wf(wfl1)}(g) + \sum_{l1 \neq wfl1} \sum_{n \in g} \sum_{i} P_i \cdot NA_{wf(l1),i}(n)$$

$NE_{wf(wfl1)}(g)$ is the forecast of the number of workflows wf to be executed on the host group g for each execution of workflow wfl1, given by:

$$NE_{wf(wfl1)}(g) = \sum_{wf \in WF(g)} NE_{wf(wfl1)}$$

Again, if $$CpuTimeP^{SLAwfl1}(g) < \sum_{n \in g} CpuTime(n)$$

the system has got enough computational resource in order to be SLA compliant for the workflow wfl1.

If $$CpuTimeP^{SLAwfl1}(g) \geq \sum_{n \in g} CpuTime(n)$$

the system is not able to be SLA compliant for the workflow wfl1 and then the workflows priority adaptation methodology described in the following item is applied.

The workflows priority adaptation methodology is applied when there exists at least a type A first level workflow associated with a SLA for which:

$$\Delta CpuTimeP^{SLAwfl1}(g) = CpuTimeP^{SLAwfl1}(g) - \sum_{n \in g} CpuTime(n) > 0$$

while for the other type B first level workflows:

$$\Delta CpuTimeP^{SLAwfl1}(g) < 0$$

The methodology consists in various actions, at least some examples of which are described in the following, ordered by complexity:
a) increase the priority of type A workflows;
b) decrease the priority of type B workflows;

c) associate a weight to each first level workflow to select the most relevant ones in order to perform actions a) or b);

d) decrease the priority of workflows that in the previous ΔT have already failed to be compliant with the SLA, for those SLA whose penalty clause does not grow up with time;

e) increase the priority of workflows that in the previous ΔT have failed to be compliant with the SLA, for those SLA whose penalty clause grows up with time.

Actions d) and e) are based on a function that tries to minimize the cost impact of SLA penalties, defined through the Goal & Constraint Console GC.

Conveniently, this methodology keeps into account the constraints on resources utilization, like the maximum amount of CPU time to be allocated for each workflows. This means that the priority of a workflow that is already using the maximum amount of reserved CPU time cannot be increased.

If the collection of the exact cost of each workflow is too heavy, an alternative possibility is that the agent. collects at predetermined intervals (for example every five minutes) the number of "building block" executed and makes a correlation with the system resource utilization (for example CPU utilization).

Multivariate regressive techniques are often employed to estimate performance of computer systems under overload conditions. This choice rests upon the analysis of the behaviour of a number of in-field OSS that were exercised beyond their capacity. The outcome was that most of the common performance metrics for OSS, such as CPU utilization, may be modeled by linear regression. System response time, for example, grows according to a moderate exponential law. Thus, a lower bound for predicting system performance may be obtained by a multi-variate linear regression technique based on system resource data and workflow execution data.

An example of simple polynomial model is as follows:

$$U_{cpu} = a_0 + a_1 N_A + a_2 N_B + a_3 N_C$$

where
$U_{cpu}$ = CPU utilization of the agent;
$N_A$ = Number of execution of building block A;
$N_B$ = Number of execution of building block B;
$N_C$ = Number of execution of building block C;

Advantageously, all the measures (and in particular the SLA definition) should be translated in an economical quantity in order to optimize the adaptation in a consistent way.

Figure 6:
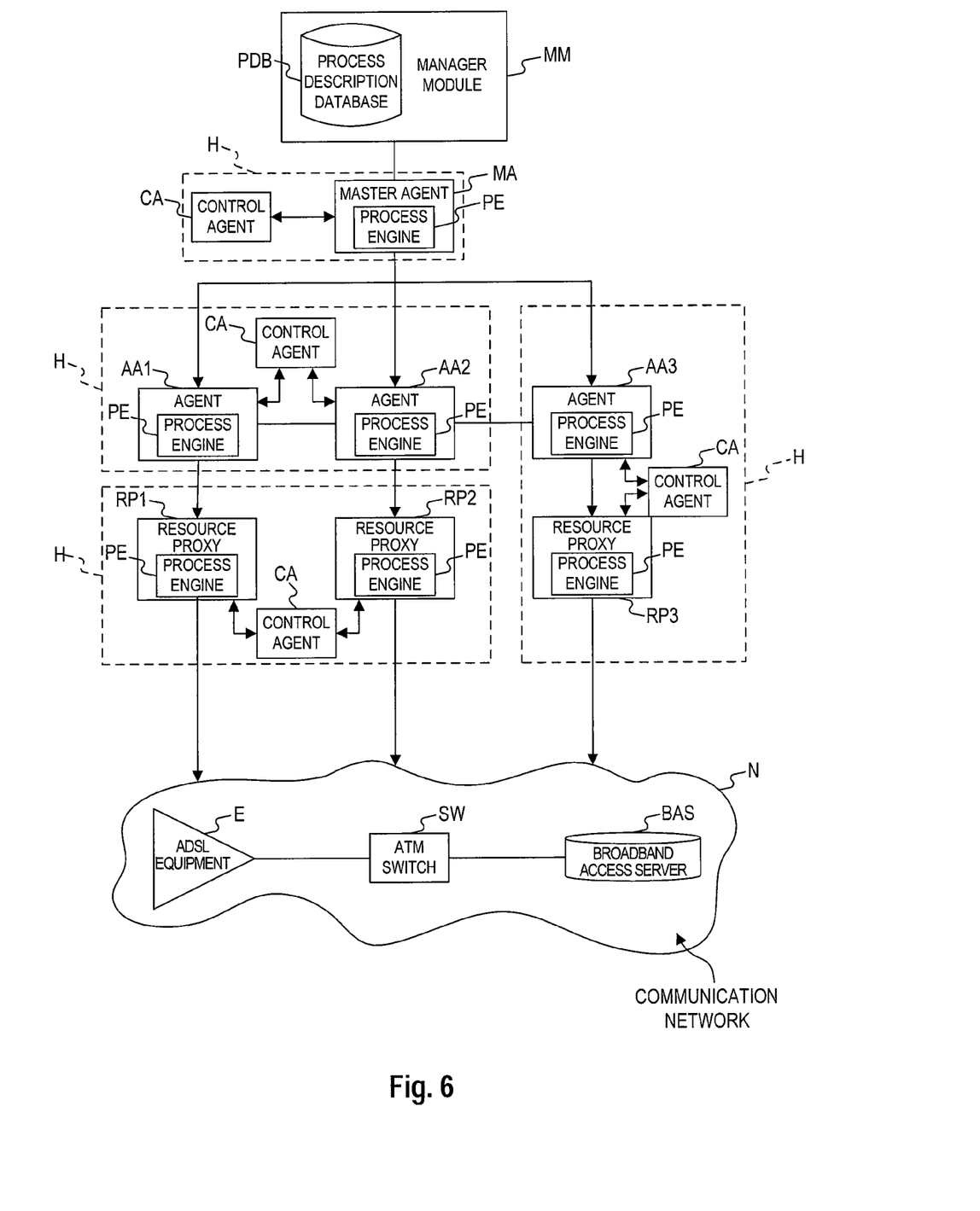
FIG. 6 is a schematic diagram of a three-layer service provisioning scenario involving the system according to the invention.

FIG. 6 shows, by way of example, the setup of a three-layers service provisioning scenario according to the invention, characterised by flexibility and scalability.

In the example, the bottom layer agents are responsible for interaction with the network element and are called Resource Proxy and indicated RP1, RP2, RP3.

A broadband service named "Offer 1" shall be delivered in a telecommunications network that includes access devices (e.g. an ADSL Equipment), an ATM backbone and BASs (Broadband Access Servers) in order to gain IP connectivity.

Examples of services offered by RP are configuration of ports, creation of cross-connections, modification of connection attributes. Each of them can include sequences of basic commands to be sent and/or received to/by the equipments.

AA1, AA2, AA3 are the agents that manage, respectively, the Resource Proxy RP1 representing the image of the ADSL Equipment E (endpoint A of the end-to-end circuit), the Resource Proxy RP2 representing the image of the ATM Switch SW connected to the ADSL Equipment E and the Resource Proxy RP3 representing the image of the BAS (endpoint Z of the end-to-end circuit).

Figure 7:
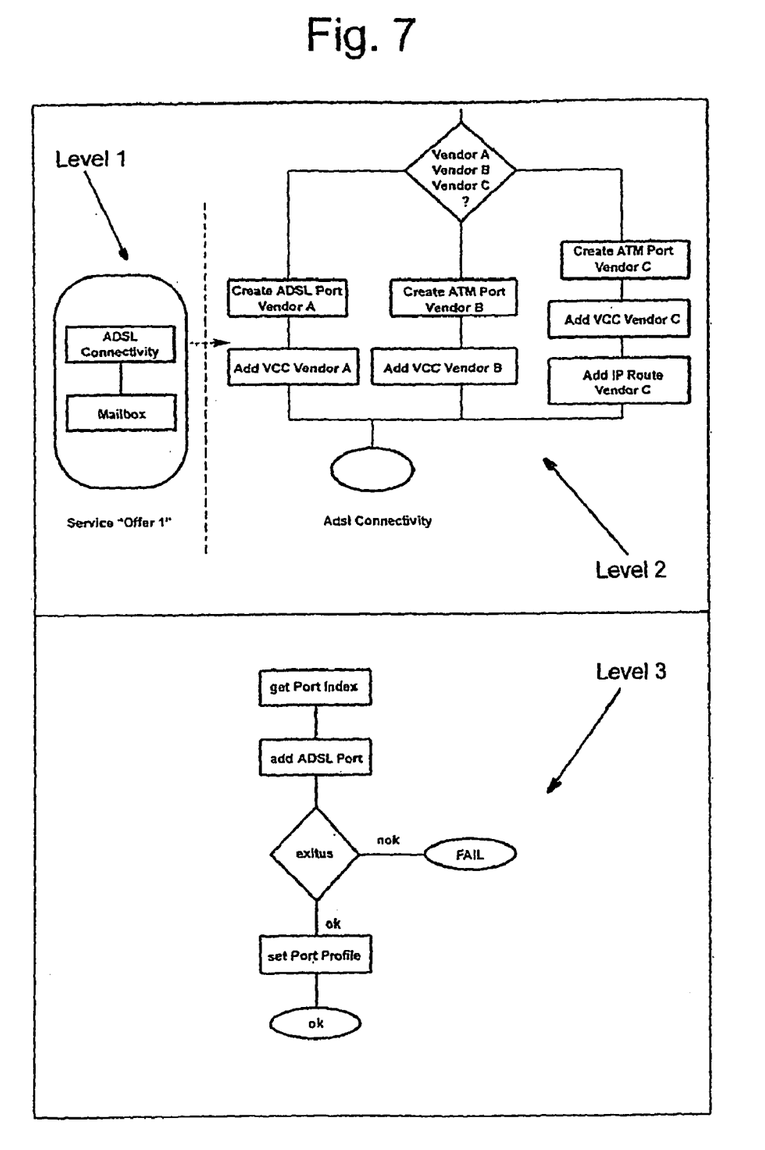
FIG. 7 is a diagram showing multi-level workflows in the service provisioning scenario of FIG. 6.

The multilevel workflows involved in the provisioning activity of the service "Offer 1" are shown in FIG. 7.

Level 1 or top level workflow comprises two steps or tasks and is executed by Master Agent MA. The first one (ADSL Connectivity) requests execution of a level 2 workflow that is executed at the agent level (AA1, AA2, AA3) while the second one, i.e. the Mailbox task (not detailed in this example) can be performed by an external platform.

The ADSL Connectivity Task is thus a Level 2 workflow that comprises a sequence of Level 3 workflows, technology and vendor dependent, that are executed at Resource Proxy Level (RP1, RP2, RP3). The level 3 workflows comprises sequences of the commands that must be performed on a communication network equipment by the Resource Proxy. An example of level 3 workflow is given in FIG. 7 by expanding level 2 workflow "Create ADSL Port Vendor A".

Measuring the resource usage (CPU, RAM) and the elapsed time of each workflow, the Monitoring Console MC highlights if there are problems on a particular Vendor or on a particular workflow.

Supposing that there is another service "Offer 2" similar to the service "Offer1" but without the Mailbox, then the Goal Console allows to define SLA on Offer1 and Offer2 with a SLA control rule and a related cost function. If the SLA on service "Offer2" is more important (for example the cost function associated to "Offer2" is equal to the number of seconds that exceed an average execution time of 1 second and the cost function associate to "Offer1" is equal to the number of second that exceed an average execution time of 4 second) then priority on "Offer2" grows faster than the priority of "Offer1". This means that when the hardware resource (e.g. CPU) are scarce with the same number of requests, the throughput of "Offer2" will be higher then the throughput of "Offer1".

Therefore, the platform adjusts resource utilization to reach its target, be it a requirement set by an external operator or due to agent saturation.

Naturally, the principle of the invention remaining the same, the forms of embodiment may be varied widely with respect to those described and illustrated purely by way of non-limiting example, without thereby departing from the scope of protection of the present invention defined by the appended claims.

The invention claimed is:

1. A method for managing resources in a platform for at least one of a telecommunication service and network management, wherein the platform is able to manage process executions having process priorities executed by distributed agents, comprising:

setting target data to be met by the platform, wherein said target data comprises goals on the process executions executed by the distributed agents and constraints on platform resource utilization;

monitoring, using a local performance control agent associated with a plurality of distributed agents and co-located with the associated plurality of distributed agents on a host computer, the process executions executed by each distributed agent and resource utilization associated with the process executions performed by each distributed agent, wherein each distributed agent independently executes process executions spontaneously;

performing, by the local performance control agent, local optimization of resource management;

collecting from the local performance control agent performance data representative of said process executions and of said resource utilization;

comparing the collected performance data with the set target data;
establishing at least one penalty clause on the basis of a comparison between the collected performance data of the distributed agents and the set target data; and
re-allocating resources to distributed agents to execute process executions based in part on the established at least one penalty clause, wherein re-allocating resources comprises:
executing an evaluation step and a decision step at determined observation intervals, wherein as part of the evaluation step, the collecting step includes,
collecting from the local performance control agent, data representative both of process executions and of the number of forecasted process executions for at least one of subsequent observation intervals, and evaluating, on the basis of said collected data, the resources as required by said distributed agents, and as part of the decision step, the comparing step includes
comparing the resources as required to resources as available by each of said distributed agents, and applying determined resource re-allocation rules to said distributed agents in order to modify resource utilization among at least one of the distributed agents, to change process priorities at the distributed agents, and to reallocate process executions among the distributed agents.

2. The method according to claim 1, comprising:
providing distributed process engines to the distributed agents; and
storing process descriptions representative of processes in a process descriptions database associated with said distributed process engines.

3. The method according to claim 2, wherein the process descriptions comprise at least one of workflows and rules.

4. The method according to claim 1, comprising:
providing the distributed agents on hierarchical levels according to a multi-layered configuration of agents.

5. The method according to claim 4, wherein the process executions are assigned to the multi-layered configuration of distributed agents by a centralized manager module.

6. The method according to claim 5, wherein the collecting performance data step comprises:
transmitting said performance data to at least one of the centralized manager module and to a plurality of local performance control agents associated with the distributed agents.

7. The method according to claim 5, comprising:
providing at least one master agent at the top layer of said multi-layered configuration of distributed agents, the master agent charging process executions to distributed agents located in sub-layers of said multi-layered configuration.

8. The method according to claim 1, comprising, for each distributed agent, the steps of:
inserting a process execution request into a multilevel priority process queue according to a priority criterion; and
scheduling the process executions on the basis of the multilevel priority process queue.

9. The method according to claim 8, comprising scheduling process executions by at least one process engine thread associated with each distributed agent.

10. The method according to claim 8, wherein the process execution requests in the multilevel priority process queue are upgraded based on a timeout criterion.

11. The method according to claim 6, wherein each control agent controls a number of process engine threads and resource utilization by the distributed agents.

12. The method according to claim 6, wherein
the control agent executes a load balancing algorithm for determining the load of the distributed agents; and
each distributed agent sends process execution requests to other distributed agents on the basis of a criterion, including at least an evaluation of the load of the distributed agents as determined by the control agent.

13. A platform for managing resources for at least one of telecommunication services and networks, comprising
a plurality of distributed agents able to manage process executions having process priorities, comprising:
process engines associated with said distributed agents and configured for independently executing the process executions spontaneously and monitoring the process executions and resource utilization by the distributed agents, and by
a centralized manager module, configured for:
setting target data to be met by the platform, wherein said target data comprises goals on the process executions by the distributed agents and constraints on platform resource utilization to be met by the platform;
collecting performance data representative of said process executions and of said resource utilization by the distributed agents;
comparing the collected performance data with the set target data;
establishing at least one penalty clause on the basis of a comparison between the collected performance data of said distributed agents and the set target data;
re-allocating resources to said distributed agents for process executions by distributed agents on the basis of said established at least one penalty clause; and
a local performance control agent associated with at least two distributed agents of the plurality of distributed agents, wherein the local performance control agent is co-located with the at least two associated distributed agents on a host computer, and the local performance control agent is configured to perform local optimization of resource management,
wherein said centralized manager module comprises a resource allocator module comprising:
an evaluate module configured for:
collecting, from the local performance control agent, data representative both of process executions and of the number of forecasted process executions for a subsequent observation interval, and evaluating, on the basis of said collected data, the resources as required by said distributed agents, and
a decide module configured for:
comparing the resources as required to resources as available by each of said distributed agents, and applying determined resource re-allocation rules to said distributed agents in order to modify at least one of resource utilization among the distributed agents, to change process priorities at the distributed agents, and to reallocate process executions among the distributed agents.

14. The platform according to claim 13, wherein said centralized manager module comprises:
a process description database for storing process descriptions representative of behavorial and functional aspects of the platform.

15. The platform according to claim 14, wherein said centralized manager module further comprises:

a service creation console arranged for definition, creation and modification of the process descriptions in the process description database.

16. The platform according to claim 14, wherein the process descriptions comprise workflows and/or rules.

17. The platform according to claim 13, wherein
said plurality of distributed agents are organized on hierarchical levels according to a multi-layered configuration, and wherein
said centralized manager module is configured for assigning process executions to said multi-layered configuration of distributed agents.

18. The platform according to claim 13, comprising:
local performance control agents associated with at least a set of distributed agents, said process engines comprising resource monitor modules being configured for:
transmitting said performance data to the centralized manager module and/or to the local performance control agents associated with the distributed agents.

19. The platform according to claim 17, comprising:
at least one master agent located at the top layer of said multi-layered configuration of distributed agents and configured for charging process executions to distributed agents located in sub-layers of said multi-layered configuration.

20. The platform according to claim 13, comprising:
at least one processing machine comprising at least one set of said plurality of distributed agents.

21. The platform according to claim 20, wherein at least one local performance control agent is associated with said at least one processing machine.

22. The platform according to claim 21, wherein said at least one local performance control agent comprises:
a common local performance monitoring module arranged for collecting performance data representative of resource utilization and process execution by the distributed agents and transmitting the performance data to the centralized manager module;
a common thread controller coupled to the resource monitor arranged for creating process engine threads for executing waiting processes; and
a common dispatcher module coupled to the process engine threads and arranged for sending process execution requests to other distributed agents according to a predetermined load balancing algorithm.

23. The platform according to claim 13, wherein the manager module comprises:
a capacity planning module configured for:
forecasting availability of resources in an observation interval on the basis of historical performance and of data representative of present resource utilization.

24. The platform according to claim 13, wherein the manager module comprises:
an administrative console configured for:
defining the hardware configuration of the platform; and
defining constraints on process executions.

25. A telecommunications network managed by a platform according to claim 13.

26. A method for setting up and managing telecommunication services, or an ADSL (Asymmetric Digital Subscriber Line) connectivity service, comprising the step of managing resources according to the method as defined in claim 1.

27. A non-transitory computer readable medium encoded with a computer program product or computer program set of computer program products loadable into a memory of at least one computer, the computer program product or computer program set of computer program products comprising software code portions for performing the steps of claim 1.

28. A method for managing resources in at least one of a telecommunication service and network, the method comprising:
running a plurality of distributed agents, the distributed agents including at least one process engine for executing at least one management process, wherein the at least one process engine includes at least one of a workflow engine and a rule engine;
setting target data to be met, the target data including goals on the process executions executed by the plurality of distributed agents and constraints on resource utilization;
monitoring, by the at least one process engine, the process executions executed by each distributed agent and resource utilization associated with the process executions performed by each distributed agent, wherein each distributed agent independently executes process executions spontaneously;
performing, by a local performance control agent associated with, at least two distributed agents of the plurality of distributed agents, local optimization of resource management, wherein the local performance control agent and the at least two distributed agents are co-located on a host computer;
collecting performance data representative of said process executions and of said resource utilization;
comparing the collected performance data with the set target data;
establishing at least one penalty clause on the basis of a comparison between the collected performance data of the distributed agents and the set target data; and
re-allocating resources to distributed agents to execute process executions based in part on the established at least one penalty clause, wherein re-allocating resources comprises:
executing an evaluation step and a decision step at determined observation intervals, wherein as part of the evaluation step,
the collecting step includes,
collecting from the local performance control agent, data representative both of process executions and of the number of forecasted process executions for at least one of subsequent observation intervals, and evaluating, on the basis of said collected data, the resources as required by said distributed agents, and
as part of the decision step, the comparing step includes
comparing the resources as required to resources as available by each of said distributed agents, and applying determined resource re-allocation rules to said distributed agents in order to modify resource utilization among at least one of the distributed agents, to change process priorities at the distributed agents, and to reallocate process executions among the distributed agents.

29. A platform for managing resources for at least one of telecommunication services and networks, comprising
a plurality of distributed agents, each distributed agent including at least one process engine capable of managing the execution of at least one management process, the at least one process engine including at least one of a workflow engine and a rule engine, and monitoring the process executions and resource utilization by the distributed agents, wherein each distributed agent independently executes process executions spontaneously; and
a centralized manager module, configured for:

setting target data to be met by the platform, wherein said target data includes goals on the process executions by the distributed agents and constraints on platform resource utilization to be met by the platform;

collecting performance data representative of said process executions and of said resource utilization by the distributed agents;

comparing the collected performance data with the set target data;

establishing at least one penalty clause on the basis of a comparison between the collected performance data of said distributed agents and the set target data;

re-allocating resources to said distributed agents for process executions by said distributed agents on the basis of said established at least one penalty clause; and a local performance control agent associated with at least two distributed agents of the plurality of distributed agents, wherein the local performance control agent is co-located with the at least two associated distributed agents on a host computer, and the local performance control agent is configured to perform local optimization of resource management, wherein said centralized manager module comprises a resource allocator module comprising:

an evaluate module configured for:
collecting, from the local performance control agent, data representative both of process executions and of the number of forecasted process executions for a subsequent observation interval, and evaluating, on the basis of said collected data, the resources as required by said distributed agents, and a decide module configured for:
comparing the resources as required to resources as available by each of said distributed agents, and applying determined resource re-allocation rules to said distributed agents in order to modify at least one of resource utilization among the distributed agents, to change process priorities at the distributed agents, and to reallocate process executions among the distributed agents.

* * * * *